INVENTORS.
JOHN A. BERGREN.
CHARLES G. BERGREN.
BY THEIR ATTORNEYS.

June 16, 1931.  J. A. BERGREN ET AL  1,810,459
POTATO CUTTING MACHINE
Filed July 11, 1927  4 Sheets-Sheet 2
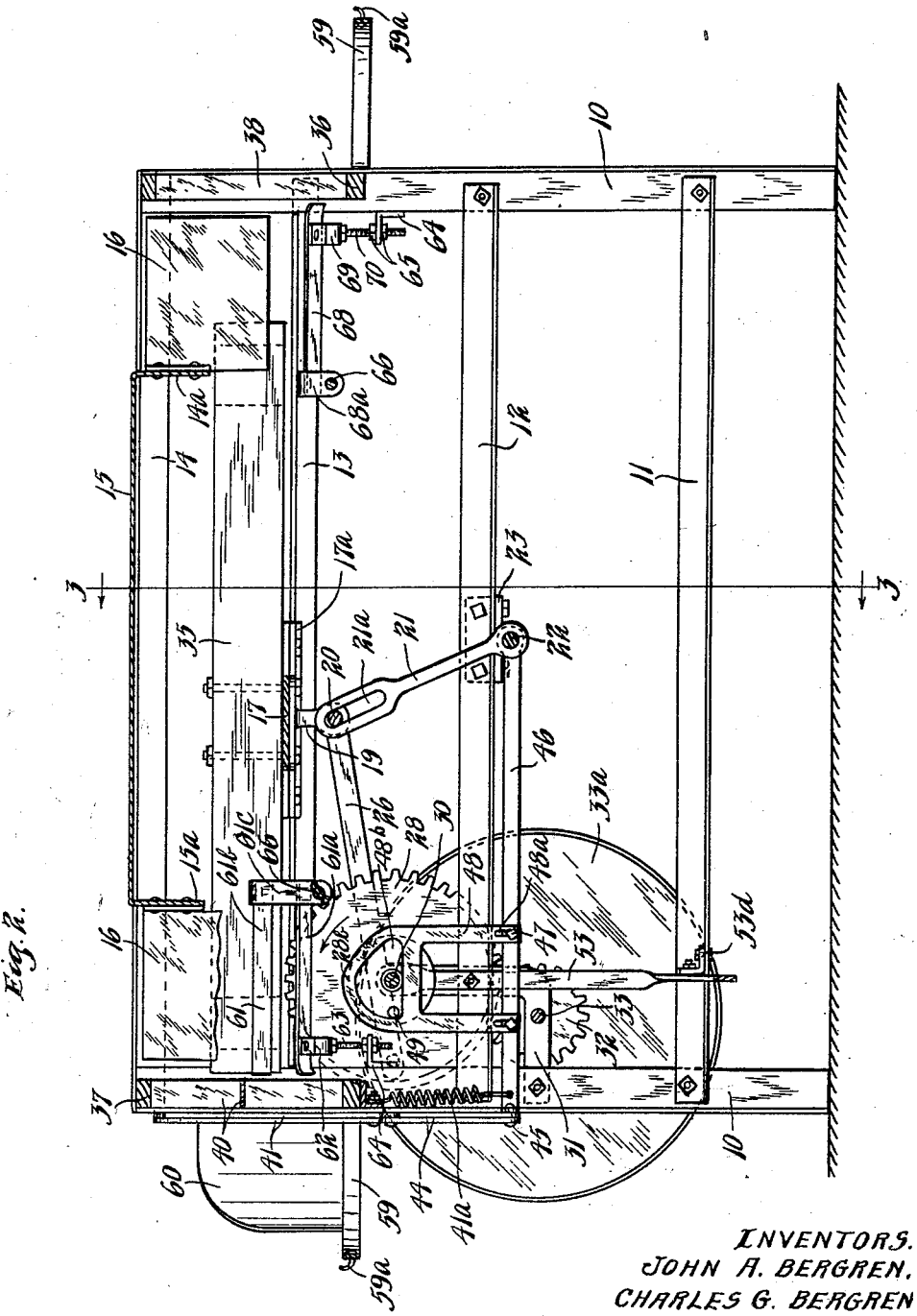
INVENTORS.
JOHN A. BERGREN.
CHARLES G. BERGREN
BY THEIR ATTORNEY.

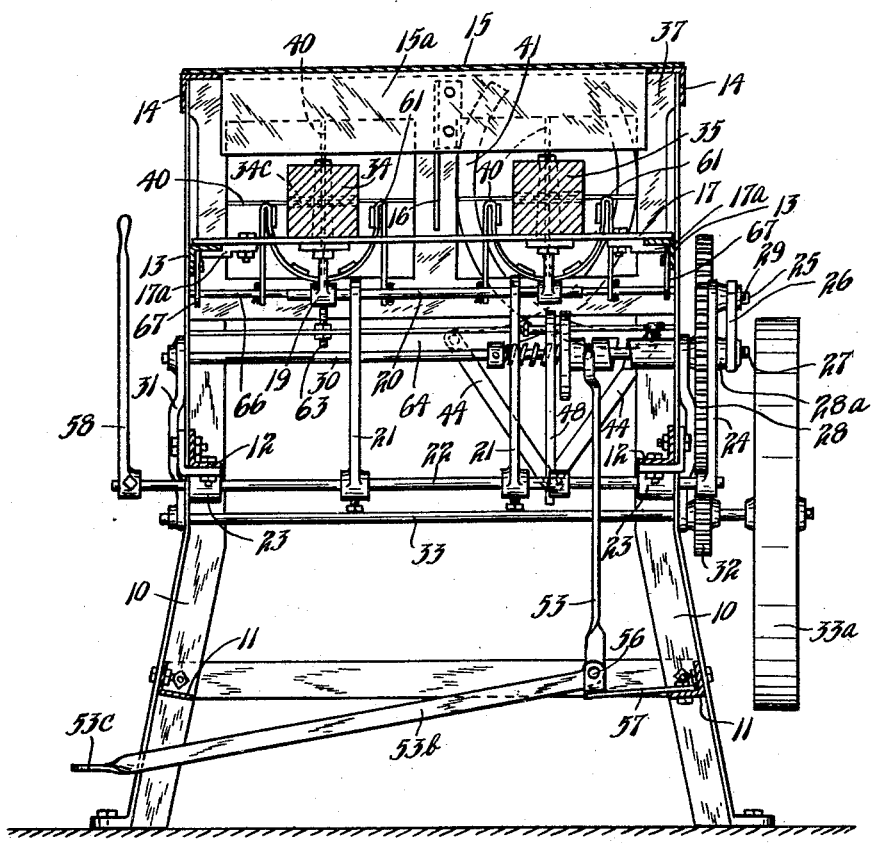

June 16, 1931. J. A. BERGREN ET AL 1,810,459
POTATO CUTTING MACHINE
Filed July 11, 1927  4 Sheets-Sheet 4
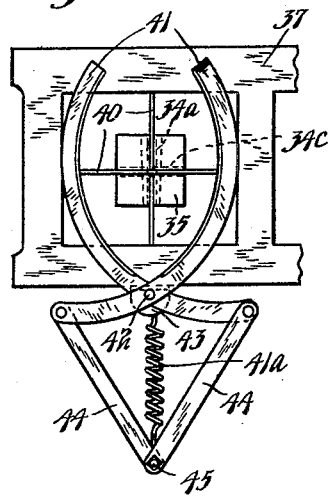
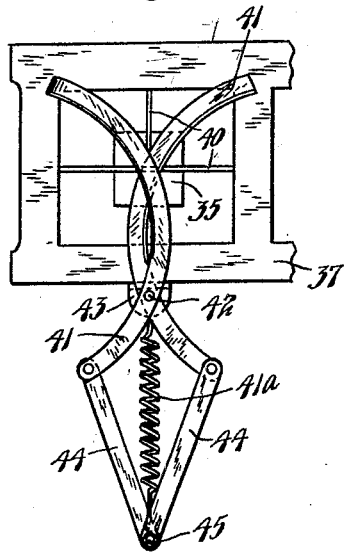
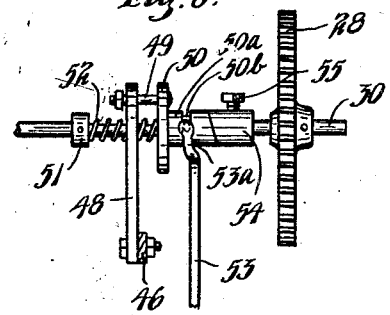
INVENTORS.
JOHN A. BERGREN.
CHARLES G. BERGREN.
BY THEIR ATTORNEYS.

Patented June 16, 1931

1,810,459

UNITED STATES PATENT OFFICE

JOHN A. BERGREN AND CHARLES G. BERGREN, OF LAKE PARK, MINNESOTA, ASSIGNORS TO BERGREN MANUFACTURING COMPANY, A CORPORATION

POTATO CUTTING MACHINE

Application filed July 11, 1927. Serial No. 204,716.

This invention relates to a potato cutting machine such as is used for cutting potatoes into several parts for planting. As is well known, potatoes are usually cut into sections with one or more eyes in each section, and where a large number of the potatoes are to be cut, the cutting of potatoes by hand becomes quite a task. When the small potatoes are cut, it is desirable to have a supporting and cutting means which will cut the potatoes into two pieces which are substantially of equal size. In the cutting of a large number of potatoes, the juice from the potatoes gathers on the parts of the machine, and where a plunger is used to move the potatoes to the knives, this juice and dirt collects thereon so that means should be provided for clearing the dirt from the plunger. It is also desirable to have a potato cutting machine adapted to be operated either by hand power or by motor. It is an object of this invention, therefore, to provide a potato cutting machine having a simple and efficient means for supporting potatoes so that they will be properly cut when moved to the knives.

It is a further object of the invention to provide a potato cutting machine having means at each end through which the potatoes must be placed in order to properly be presented to the knives.

It is a further object of the invention to provide a potato cutting machine comprising a knife, a plunger for moving the potatoes to the knife, which plunger has a groove therein for embracing said knife, said groove being constructed and arranged to be cleared of dirt or other accumulated material.

It is still another object of the invention to provide a potato cutting machine having thin vertical and horizontal knives against which the potatoes are moved, together with a clipping device comprising knives moving in a plane at right angles to the plane of said first mentioned knives to further cut the potatoes which have been moved past the first mentioned knives.

It is another object of the invention to provide a potato cutting machine with such a clipping device as set forth in the preceding paragraph, with simple and efficient means for positively operating the same in synchronism with said plungers.

It is still another object of the invention to provide a potato cutting machine having means by which it may be driven by a belt from a suitable motor, together with means for throwing out the belt driving means so that the same can be operated by means of a hand lever.

These and other objects and advantages of the invention will be fully set forth in the following description made in connection with the accompanying drawings, in which like reference characters refer to similar parts throughout the several views and in which:—

Fig. 2 is a vertical section taken on line 2—2 of Fig. 1, as indicated by the arrows;

Fig. 3 is a vertical section taken on line 3—3 of Fig. 2, as indicated by the arrows;

Fig. 4 is a view in end elevation of the clipping device with the knives open;

Fig. 5 is a view similar to Fig. 4 with the knives closed; and Fig. 6 is a partial view similar to Fig. 3 showing the driving mechanism in another position.

Figure 1:
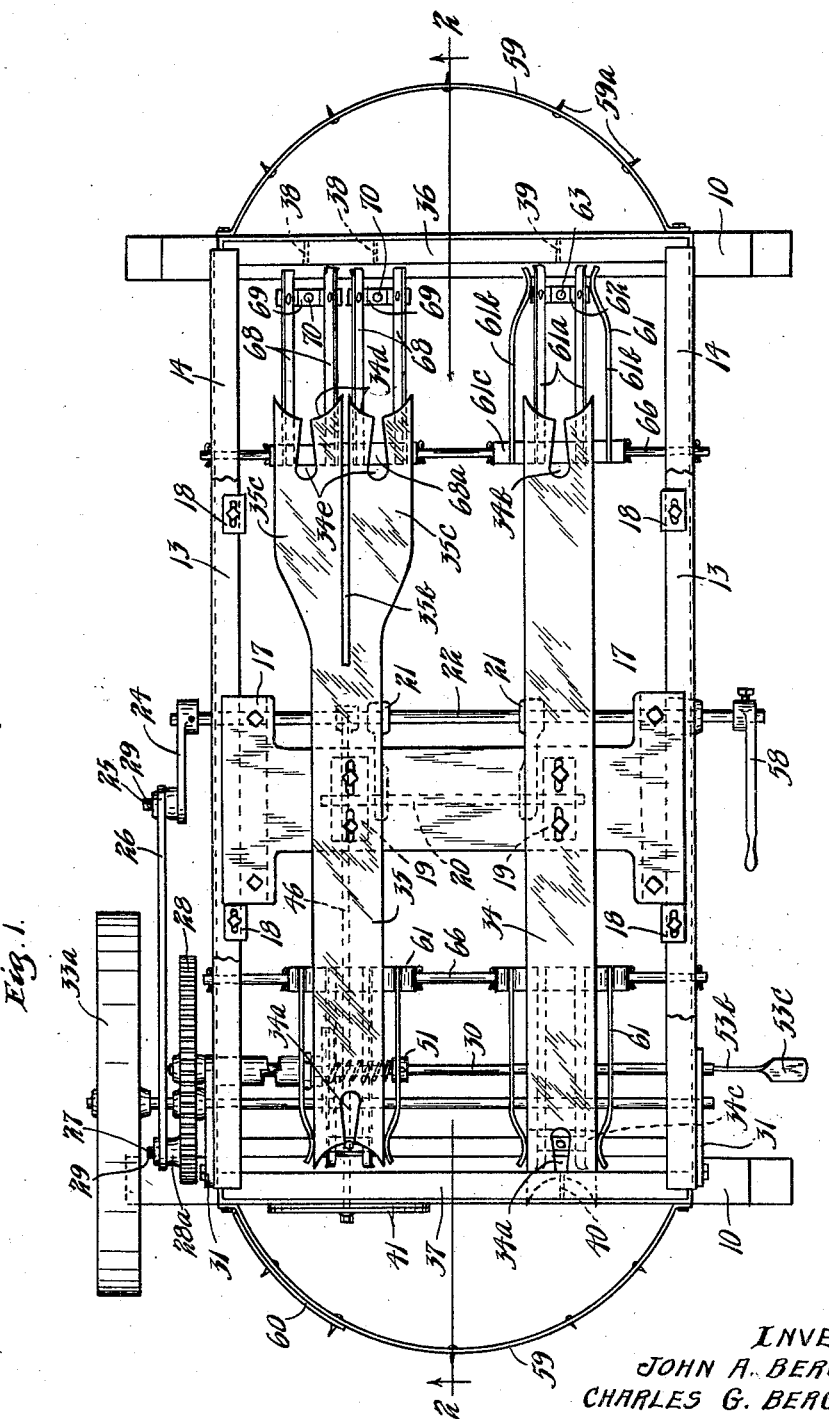
Fig. 1 is a plan view of the device.

Referring to the drawings, a machine is shown comprising the vertical frame members 10 disposed substantially at the corners of a rectangle and while these frame members may be of any suitable form, in the embodiment of the invention illustrated they are shown as in the form of angle bars. The vertical frame members 10 are connected by longitudinally extending members 11, 12, 13 and 14. While the members 11 to 14 may also be of various shapes, in the embodiment of the invention they are also shown as in the form of angle bars and disposed as clearly shown in Fig. 3. The angle bars 14 have secured on top thereof a plate 15 which, as shown in Fig. 3, extends at its central portion entirely across the space between members 14, but at its end portions has portions 15a thereof bent downward and disposed substantially vertically. The members 15a have secured thereto dividing plates 16 which extend in vertical planes longitudinally of the machine.

The members 13 form guideways for a cross head construction comprising a plate 17 extending between said bars 13 on top thereof to which are secured the members 17a being offset to embrace the horizontal flanges of the members 13, thus forming slides movable on the members 13. The movement of the members 17 and 17a may be limited on the members 13 by the adjustable stops 18. The bar 17 has secured thereto cross head brackets 19 having depending arms with hubs at their lower ends through which extends a rod 20. The rod 20 is embraced by a slot 21a in an arm 21 having a hub at its lower end pivoted on a bar 22 carried in bearings 23 secured to the lower side of the angle bars 12. The rod 22 projects at each side of the members 12 and at one side has secured thereto an arm 24 having a hub at its upper end receiving a pin 25 on which is pivoted one end of link 26 pivoted at its other end on a pin 27 secured in a boss 28a of the gear 28. The link 26 is held on the pins 25 and 27 by cotter pins 29. The gear 28 is secured to a shaft 30 journaled in bearings 31 secured to members 12. The gear 28 meshes with and is driven by gear 32 secured to a shaft 33 also journaled in bearings 31 and having secured at one end a belt pulley 33a. The bar 17 has secured thereto by the same bolts which secure the brackets 19, plungers 34 and 35. These plungers as shown in Fig. 1 have curved concave ends, said plungers having slots 34a and 35a extending thereinto longitudinally of said plungers and it will be noted that said slots increase in width inwardly, flare downwardly and are shown as having rounded ends. The plunger 34 also has its other end curved and concave, with the slots 34b extending therein similar to the slot 34a. The plunger 35 at its other end is divided by a longitudinally extending slot 35b, thus forming in effect two plungers 35c, each of which have curved concave ends 34d into which extend the slots 34e similar to the slots 34a. The machine has cutter heads 36 and 37 secured in the vertical members 10 and extending therebetween, which cutter heads comprise open rectangular frames. The cutter head 36 has a pair of spaced vertical knives 38 extending from top to bottom thereof alined with the centers of the slots 34e and said frame also has another vertical knife 39 extending from top to bottom thereof and alined with the center of slot 34b. The cutter head 37 has pairs of intersecting vertical and horizontal knives 40, the vertical knives being alined with a horizontal slot 34e extending inwardly of the end of plungers 34 and 35 and having a rearwardly enlarged end similar to the slots 34a.

The cutter head 37 has disposed in front of one of the pair of knives 40, a clipping device comprising a pair of thin flat arcuate knife members 41 which are pivoted on a pivot 42 mounted in a small angle bracket 43 secured to the bottom of the cutter frame 37. The knives 41 have links 44 secured thereto which are in turn pivotally connected by the headed and nutted bolt 45. A spring 41a is connected at one end to the bracket 43 and at its other end to an arm 46 adjacent one end thereof, which end is bent at right angles and is secured to bolt 45 which passes therethrough. The arm 46 is pivoted at its other end on the shaft 22. Said arm 46 has adjustably secured thereto by bolts 47, a bracket 48, having slots 48a in the spaced arms thereof through which bolts 47 pass. Said bracket 48 has an opening 48b at its upper end into which projects a pin 49 which pin is secured to a crank disk 50 secured to shaft 30 which also carries the gear 28. A collar 51 is secured to shaft 30 and a coiled spring 52 surrounds said shaft, bearing at one end against collar 51 and at its other end against the disk 50 which has a hub 50a extending at one side thereof, in which is formed a circumferentially extending groove 50b. A clutch fork 53a embraces hub 50a and has pins projecting into opposite sides of the groove 50b. The hub 50a is formed at its end as a half clutch, and is adapted to co-operate with a similar half clutch 54 secured to the shaft 30 by means of a set screw 55. The fork 53a is formed at the upper end of the lever 53 which is a bell crank lever and has its other arm 53b extending laterally and downwardly to one side of the machine, where it is provided with a foot pedal 53c, said lever being pivoted on the pivot 56 carried in a bearing 57 secured to one of the members 11. The lever 53 can be held in its lower position by means of the stop 53d secured to one of the members 11. The shaft 22 is provided at the end opposite that carrying the arm 24, with a hand lever 58. The frame is provided with bails 59 at each end, of semicircular shape, carrying spaced radially extending pins 59a having their pointed ends projecting outwardly from said bails. One of the bails 59 has a shield 60 secured to and upstanding therefrom at the side thereof disposed toward the driving pulley 33a and extending partially in front of the clipper device.

The potatoes are supported for presentation to the knives by forks or baskets 61. These baskets comprise two laterally spaced narrow strips 61a which are connected at their rear ends to a semi-circular strip of thin narrow metal 61c, as by rivets or spot-welding, and are secured adjacent their front ends to a yoke or Y-shaped member 62 having the upper ends of threaded bolts 63 secured thereto, which bolts project downwardly through angle brackets 64 and are adjustably secured therein by jamb nuts. The forks also comprise laterally spaced narrow members 61b which are also secured at their rear ends to the member 61c as by riveting or spot-welding, and it will be noted that the forward ends of members 61b are curved inwardly and then outwardly, said ends being free. It is also pointed out that the ends of the members 61a are curved outwardly away from each other. The members 61c have their ends reversely bent and extending downwardly vertically and a rod 66 passes through these ends and is secured in brackets 67 secured to and extending downwardly from the members 13. The said ends of members 61c are held in position by cutter pins extending through the rods 66. The forks or baskets 61 described are used in combination with the knives 39 and 40. The potatoes are presented to knives 38 by a pair of smaller forks or baskets 68, each comprising a single pair of laterally spaced thin and narrow strips secured at their rear ends to a member 68a similar to the members 61c also mounted on one of the rods 66 and having their front ends slightly curved, diverging and secured adjacent their terminals to a yoke or Y-shaped members 69 similar to the members 62 and also having adjustable threaded bolts 70 secured therein by which the forks 68 may be adjusted vertically.

In operation when the machine is used as a power machine the pulley 33a will be driven by a belt from a suitable motor and gear 28 will be driven. The arm 24 will be oscillated through link 26 oscillating shaft 22 and arms 21. Arms 21 will reciprocate the rod 20, the cross head and plungers 34 and 35. The operator stands at the side of the machine and removes the potatoes from an open bottom hopper (not shown) supported by the machine, and drops the potatoes into the baskets 61 and 68. If the potatoes are quite small, they are placed in the baskets or forks 68 and will be centered therein, as the strips forming the forks incline downwardly and inwardly. When the plungers are reciprocated, the potatoes are moved forwardly toward the knives 38 and will be cut in half, the slots 34e embracing the knives 38 so that the potato is pushed past the knives. The ends of members 68 diverge outwardly so that there will be no clamping or gripping action on the potatoes, as they are expanded by being cut by the knives 38. It has been found much preferable to cut the small potatoes in two with a vertical knife rather than with a horizontal knife. It will be seen that with a horizontal knife the potatoes will not always be centered with the knife, as when a real small potato is cut, the larger portion of the same will pass under the knife, and it is impracticable to adjust the fork or carrier for each potato. If the potato is of larger size, it is placed in one of the forks 61 at the ends of plunger 34 and will be pushed through the vertical and horizontal knives and cut into four pieces. The said members 61b will center the potato laterally as it is brought up against the knives 39 and 40. The slots in the ends of member 34 embrace the knives so that the potato is pushed entirely therethrough. If a larger potato is to be cut, it is placed in the fork 61 at the end of the plunger 35 and presented to the knives 40 with which the clipping device co-operates. The potato is pushed through the knives 40 and cut as already described and as the potato is pushed substantially half way through the outer side of the knives 40, the bottom 46 will be depressed by the revolution of pin 49 on the crank disk 50, and the knives 41 will be swung toward each other as shown in Fig. 5, thus cutting the potato transversely so that the potato will be cut into eight pieces. As the knives 41 move together, they embrace the divided parts of the potato so that the same are held together until completely cut. This is a great improvement over the vertical knife which merely moves vertically through the potatoes in one direction. Such a knife tends to separate the pieces and does not usually cut the last pieces engaged with a clean cut. The knife is apt to carry an uncut piece of potato and the piece of potato moved by the knife will often bend the horizontal knife. As the pin 49 continues to revolve, the member 48 will be raised, thus swinging upward the arm 46 and restoring the knives 41 to their open position. The knives are not supported in either movement by the spring 41a this spring merely being provided to keep the knives from accidentally swinging to closed or semi-closed position, said spring normally tending to hold the knives in open position. There is always considerable dirt and dust on the potatoes and the juice of the potatoes is somewhat sticky. This causes an accumulation of dirt and gum on the plungers. If the slots 34a, 34b and 34e are straight sided, this gummy accumulation tends to fill up the slots so that objectionable pressure is put on the knives. With the slots having the enlarged rear ends and downward flare as shown, the accumulated dirt passing into the slots drops therefrom so that the slots are kept clean. By providing the top plate 15 with the depending ends, if the operator should drop a potato into the machine when the plunger is advanced, it will ride on top of the plunger and as the plunger moves backwards, the potato will be scraped off of the plunger by the depending ends 15a of the plate 15 and will be properly positioned in the forks or baskets 61 or 68. The plate 15 covers the central portion of the machine and thus defines the places where the potato must be dropped onto the supporting members 61 and 68. This cover 15 also prevents dirt and other articles from falling down into the cross head slides and other working parts of the machine. When it is desired not to use the clipper device comprising knives 41, the lever 53b will be depressed by the operator stepping on the pedal portion 53c and the half clutch 50a will be withdrawn from half clutch 54 so that shaft 29 will not be driven. The crank disk 50 will thus not be operated and the clipper device will remain in open position. When it is desired to operate the machine as a hand machine, the belt will be removed from the pulley 33a and the cross head may then be reciprocated by merely oscillating the hand lever 58. The bails 59 with their points 59a form bag holders and the mouth of the bag is held thereon so that the potatoes when cut drop thereinto.

From the above description it is seen that applicants have provided a very simple and efficient potato cutting machine and one by means of which the potatoes can be very rapidly and accurately cut. The machine provides for accurately cutting potatoes of all sizes. The parts of the machine are quite few and simple in construction. The machine is being commercially made and has been amply demonstrated in actual practice and found to be very successful.

It will, of course, be understood that various changes may be made in the form, details, arrangement and proportions of the parts, without departing from the scope of applicants' invention, which, generally stated, consists in a device capable of carrying out the objects set forth, in the novel parts and combinations of parts disclosed and defined in the appended claims.

What is claimed is:—

1. A potato cutting machine having in combination, a knife disposed in a vertical plane, means for supporting a potato for movement and presentation to said knife and a horizontal movable plunger for moving said potato along said means to said knife, said plunger having a slot therein for embracing said knife, said slot increasing in size toward the end thereof remote from said knife and also having its sides diverging downwardly from the upper side thereof.

2. A potato cutting machine having in combination, a frame, a cutter head supported therein having a pair of spaced knives disposed in a vertical plane, a potato supporting means for each knife comprising spaced narrow members having their top surfaces inclined downwardly toward each other and their ends adjacent said knife curved outwardly and a reciprocating plunger movable over said means toward said knife having its end divided to form two portions, each portion having a concave end and a slot extending thereinto adapted to embrace one of said knives.

3. A potato cutting machine having in combination, a frame, a plurality of sets of cutting knives at each end of said frame, means for supporting potatoes for presentation to said knives, a cross head reciprocable in said frame, double ended plungers movable with said cross head for pushing a potato through said knives to complete the cutting thereof, and a plate extending over the central portion of said frame and having portions at its ends extending downward adjacent the tops of said plungers to sweep a potato from the top of said plunger and cause it to drop in front of the same.

4. The structure set forth in claim 3, and means for securing said plungers to said cross head, permitting longitudinal adjustment of said plungers.

5. A potato cutting machine having in combination, a frame, a cutting head therein having knives through which the potatoes are pushed horizontally, a support for holding the potatoes in proper relation to said knives and a clipping device at one side of said knives comprising a pair of flat movable knives having concave edges directed toward each other and pivoted together about an axis disposed below said support to move in a substantially vertical plane adjacent said first mentioned knives to embrace and cut a potato which has been moved past said knives.

6. A potato cutting machine having in combination, a frame, cutting knives secured therein, a clipping device at one side of said knives comprising curved blades with their concave sides directed toward each other and adapted to move closely adjacent said knives to embrace and cut a potato transversely, a rotatable shaft, a crank disk secured thereto having a crank pin thereon, a member movable vertically by said crank pin, an arm secured to said member and pivoted at one end, and means connecting the other end of said arm to said blades whereby when said arm is moved downwardly, said blades approach each other to cut a potato.

7. A potato cutting machine having in combination, a frame, cutting knives supported in said frame, a support extending to said knives, means for pushing a potato on said support past said knives, a clipping device for cutting said potato transversely, a driving means for operating said clipping device, said driving means being disconnectable from said clipping device and means for holding said clipping device in inoperative position with said knives separated.

8. A potato cutting machine having in combination, a frame, cutting knives supported in said frame, means for supporting a potato for presentation to said knives, comprising four longitudinally extending narrow resilient members, a pair of which extend in parallel relation at the bottom of said means with their top surfaces inclined downwardly toward each other and the other pair of which are disposed substantially in vertical planes extending substantially parallel above said first mentioned members, said last mentioned pair having their ends free and bent toward each other at their free ends, said first mentioned pair having their ends curved outwardly away from each other, and means for supporting said ends for vertical adjustment.

9. The structure set forth in claim 8, all of said members being connected at their rear ends to a U-shaped strip, and means for supporting said U-shaped strip.

10. A potato cutting machine having in combination, a frame, a set of knives, a plunger for moving potatoes to and past said knives, a reciprocating cross-head guided in said frame and carrying said plungers, a pin connected to said cross-head, a rocker arm having a slot in which said pin is disposed and adapted to reciprocate said cross-head, a shaft on which said rocker arm is mounted and journaled in said frame, a crank arm at one end of said shaft, a crank disk on said frame, a pitman connecting said disk and said crank arm and means for rotating said disk.

11. A potato cutting machine having in combination, a frame, intersecting cutting knives supported in said frame, means for supporting a potato for movement toward and past said knives, means for pushing a potato to and past said knives for cutting said potato into separate pieces, a pair of vertically disposed curved knives at one side of said knives having concave edges directed towards each other and pivoted together, said latter knives having ends diverging from said pivot, links pivoted to said ends, said links extending downwardly, converging towards each other and pivoted at their other ends by a common pivot, means for moving said latter pivot to operate said knives, and a spring extending from said pivot to a point adjacent the pivot connecting said knives for holding said knives in separated position.

In testimony whereof we affix our signatures.

JOHN A. BERGREN.
CHARLES G. BERGREN.